United States Patent
Greenberg et al.

(10) Patent No.: US 12,480,450 B2
(45) Date of Patent: Nov. 25, 2025

(54) HYBRID ELECTRIC MULTIPLE SHAFT CORE

(71) Applicant: RTX Corporation, Farmington, CT (US)

(72) Inventors: Michael D. Greenberg, Bloomfield, CT (US); Lance L. Smith, West Hartford, CT (US); Dennis P. Cronin, Lebanon, CT (US); Nancy Poisson, Avon, CT (US); Christopher D. Ramsey, Glastonbury, CT (US); Neil Terwilliger, Meriden, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 17/359,891

(22) Filed: Jun. 28, 2021

(65) Prior Publication Data

US 2022/0412268 A1 Dec. 29, 2022

(51) Int. Cl.
*F02C 7/36* (2006.01)

(52) U.S. Cl.
CPC .......... *F02C 7/36* (2013.01); *F05D 2220/76* (2013.01)

(58) Field of Classification Search
CPC ...... F02C 7/36; F02C 6/14; F02C 7/32; F02C 3/113; F02C 3/107; F05D 2220/76; F05D 2260/40311; B64D 2027/026
See application file for complete search history.

(56) References Cited

U.S. PATENT DOCUMENTS

| | | | |
|---|---|---|---|
| 10,094,295 B2 | 10/2018 | Ullyott et al. | |
| 10,273,883 B2 * | 4/2019 | Roach | F02C 7/268 |
| 2009/0290976 A1 * | 11/2009 | Suciu | F02C 7/32 |
| | | | 415/122.1 |
| 2014/0150401 A1 * | 6/2014 | Venter | F02C 3/064 |
| | | | 60/39.45 |
| 2017/0363043 A1 | 12/2017 | Razak | |
| 2020/0095930 A1 * | 3/2020 | Blumer | F02C 3/113 |
| 2020/0298988 A1 | 9/2020 | Latulipe et al. | |
| 2020/0340406 A1 | 10/2020 | Maljean | |
| 2020/0355122 A1 * | 11/2020 | Foutch | F02C 9/18 |
| 2020/0386188 A1 | 12/2020 | Kupratis et al. | |

(Continued)

FOREIGN PATENT DOCUMENTS

| | | |
|---|---|---|
| BE | 1027469 A1 | 2/2021 |
| DE | 102020206958 A1 * | 8/2021 |
| WO | 2020058652 A1 | 3/2020 |

OTHER PUBLICATIONS

Search Report for European Application No. 22181380.1 issued Nov. 15, 2022.

*Primary Examiner* — Gerald L Sung
*Assistant Examiner* — Jingchen Liu
(74) *Attorney, Agent, or Firm* — CANTOR COLBURN LLP

(57) ABSTRACT

A hybrid electric engine of an aircraft includes a compressor, a turbine operably connected to the compressor via a variable gear ratio gearbox and a combustor configured to drive the turbine via a flow of combustion products. An electric motor is operably connected to the variable gear ratio rear box and configured to input rotational energy into the gearbox. The input of rotational energy into the gearbox from the electric motor changes a rotational speed of one of the compressor or the turbine relative to the other of the compressor or the turbine.

14 Claims, 6 Drawing Sheets

(56) References Cited

U.S. PATENT DOCUMENTS

2021/0054788 A1   2/2021   Kupratis et al.
2021/0172384 A1*  6/2021   Brown .................... F02C 6/20
2021/0348566 A1* 11/2021   Nowakowski ............ F02C 7/06

* cited by examiner

HYBRID ELECTRIC MULTIPLE SHAFT CORE

BACKGROUND

Exemplary embodiments of the present disclosure pertain to the art of gas turbine engines, and to aircraft utilizing such engines.

A traditional gas turbine engine utilizes fuel which is combusted with compressed air to drive a turbine. The turbine, in turn, drives rotation of a compressor which supplies the compressed air to the combustor. Other engines are hybrid electric gas turbine engines, which can be selectably powered by electric power from, for example a battery, or by the fuel. During certain operational stages or under certain conditions, such as taxi or cruise operation, powering the engine via electrical power may be more efficient than power via the fuel, while during other operational stages, such as takeoff or climb, operation of the engine via liquid fuel may be more efficient or practical. In addition, electrical power can be used at the same time as the liquid fuel to help drive rotation of the compressor. This may be advantageous when it is desired to increase engine airflow and power more rapidly than can be achieved with fuel alone.

BRIEF DESCRIPTION

In one embodiment, a hybrid electric engine of an aircraft includes a compressor, a turbine operably connected to the compressor via a variable gear ratio gearbox and a combustor configured to drive the turbine via a flow of combustion products. An electric motor is operably connected to the variable gear ratio rear box and configured to input rotational energy into the gearbox. The input of rotational energy into the gearbox from the electric motor changes a rotational speed of one of the compressor or the turbine relative to the other of the compressor or the turbine.

Additionally or alternatively, in this or other embodiments the input of rotational energy accelerates the compressor relative to the turbine.

Additionally or alternatively, in this or other embodiments the input of rotational energy decelerates the compressor relative to the turbine.

Additionally or alternatively, in this or other embodiments the gearbox is located at a central longitudinal axis of the engine.

Additionally or alternatively, in this or other embodiments the gearbox is located axially forward of the compressor.

Additionally or alternatively, in this or other embodiments the gearbox is located axially between the compressor and the turbine.

Additionally or alternatively, in this or other embodiments the gearbox is located remotely from the engine central longitudinal axis.

Additionally or alternatively, in this or other embodiments in the gearbox includes a planetary gear arrangement.

Additionally or alternatively, in this or other embodiments the electric motor is a variable speed electric motor.

Additionally or alternatively, in this or other embodiments the engine is a two-spool engine configuration, and the compressor is a high pressure compressor and the turbine is a high pressure turbine.

In another embodiment, a method of operating a hybrid electric engine includes combusting a fuel at a combustor, driving a rotation of a turbine via products of the combustion, and driving rotation of a compressor via rotation of the turbine. The turbine and the compressor are operably connected to a variable ratio gearbox. Rotational energy is input from an electric motor into the gearbox and a rotational speed of one of the compressor or the turbine relative to the other of the compressor or the turbine is changed via the input of rotational energy into the gearbox.

Additionally or alternatively, in this or other embodiments the compressor is accelerated relative to the turbine by the input of rotational energy.

Additionally or alternatively, in this or other embodiments the rotational speed of the compressor is increased by up to about 30%.

Additionally or alternatively, in this or other embodiments the compressor is decelerated relative to the turbine by the input of rotational energy.

Additionally or alternatively, in this or other embodiments a default speed ratio of the compressor to the turbine without input of rotational energy from the electric motor is other than 1:1.

Additionally or alternatively, in this or other embodiments a speed of the electric motor is varied.

Additionally or alternatively, in this or other embodiments the rotational energy is transmitted from the electric motor to the gearbox via a tower shaft.

Additionally or alternatively, in this or other embodiments the gearbox is located axially forward of the compressor.

Additionally or alternatively, in this or other embodiments the gearbox is located axially between the compressor and the turbine.

Additionally or alternatively, in this or other embodiments the gearbox is located remotely from the engine central longitudinal axis.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
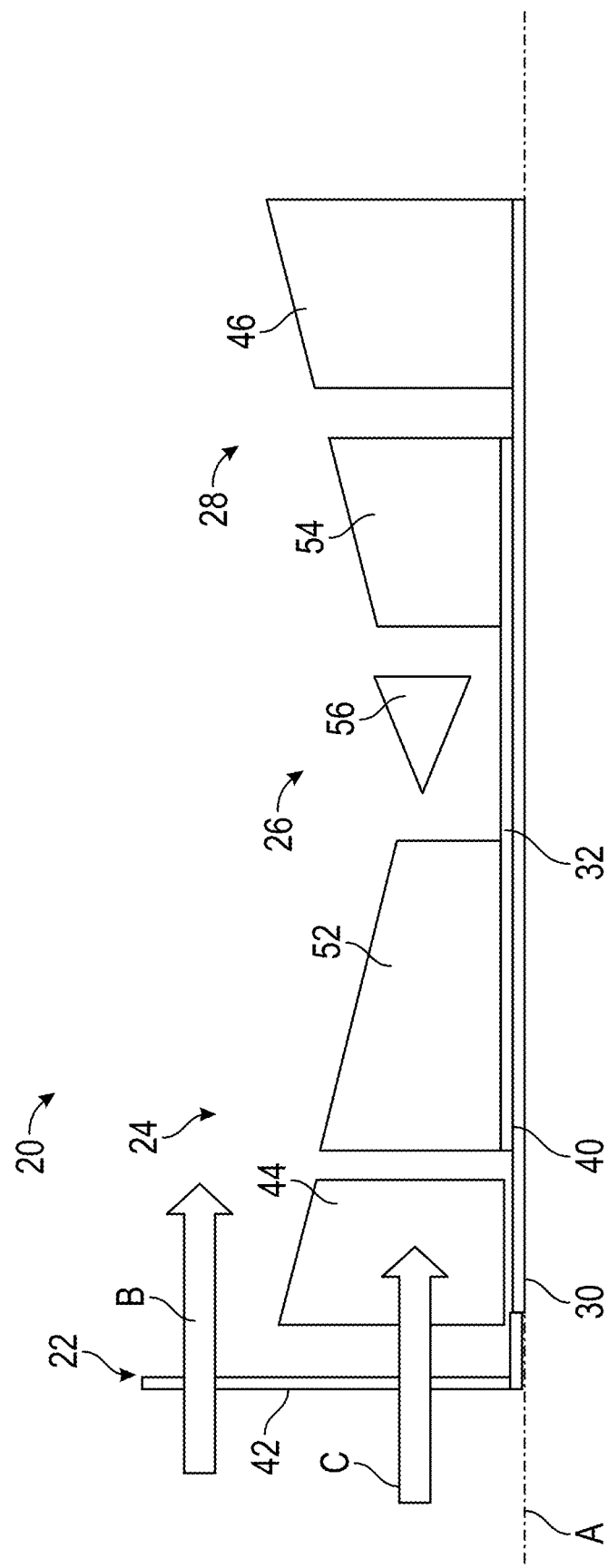
FIG. 1 is a schematic illustration of an embodiment of a hybrid electric turbine engine.

FIG. 1 schematically illustrates a hybrid electric turbine engine 20. The engine 20 is disclosed herein as a two-spool turbofan that generally incorporates a fan section 22, a compressor section 24, a combustor section 26, and a turbine section 28. Alternative engines might include other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure. The low speed spool 30 generally includes an inner shaft 40 that interconnects a fan 42, a low pressure compressor 44 and a low pressure turbine 46. The high speed spool 32 includes an arrangement that interconnects a high pressure compressor 52 and high pressure turbine 54. A combustor 56 is arranged in exemplary engine 20 between the high pressure compressor 52 and the high pressure turbine 54. In one mode of operation, the core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion.

Figure 2:
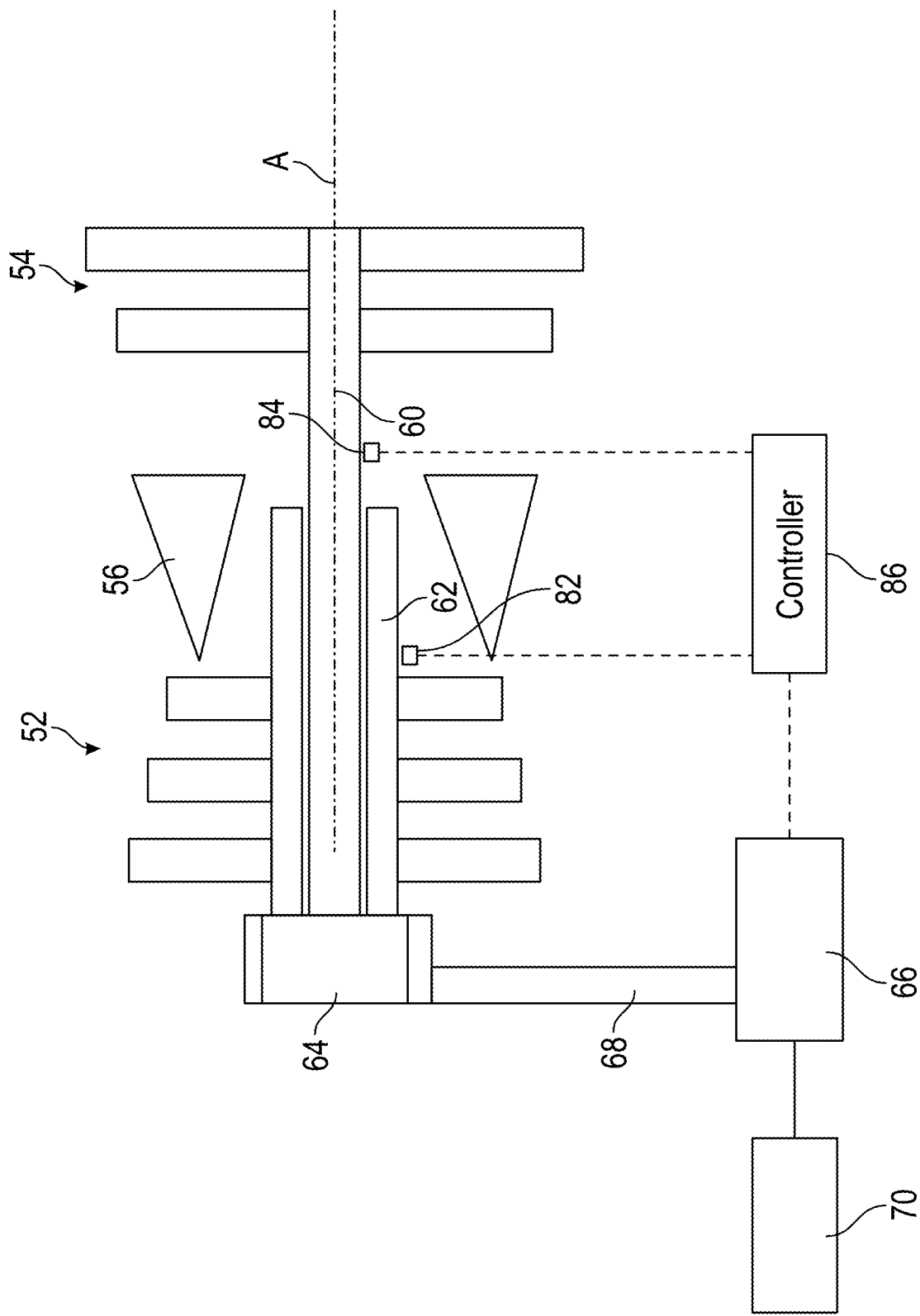
FIG. 2 is a schematic illustration of an embodiment of a variable differential gearbox arrangement of a hybrid electric turbine engine.

Referring now to FIG. 2, The high pressure turbine 54 is driven on a turbine shaft 60, with the turbine shaft 60 surrounding the inner shaft 40 (not shown for clarity). The high pressure compressor 52 is similarly driven on a compressor shaft 62. A differential or variable gear ratio gearbox 64, for example a planetary gear arrangement or a constantly variable transmission (CVT) arrangement, is connected to both the turbine shaft 60 and the compressor shaft 62, and an electric motor 66 is operably connected to the gearbox 64 via, for example a tower shaft 68. The electric motor 66 is connected to the gearbox 64 to selectably help drive the compressor shaft 62. In some embodiments, the electric motor 66 is connected to a battery 70 as an electrical power source, while in other embodiments another electrical power source may be utilized. For example, the electric motor 66 may be powered by, for example, a generator on the turbine section 28 or on the compressor section 24. When energized, the electric motor 66 inputs rotational energy into the gearbox 64 via, for example the tower shaft 68, and accelerates the compressor shaft 62 relative to the turbine shaft 60, and thus accelerates the high pressure compressor 52 relative to the high pressure turbine 54. In this manner, the electric motor's 66 power input may accelerate the high pressure compressor 52 more rapidly than the same power input could accelerate the entire high speed spool 32, because the high speed spool 32 (which includes both the high pressure compressor 52 and the high speed turbine 54) has more inertia than just the high pressure compressor 52. Thus this configuration provides for especially rapid thrust or power increase when needed, such as immediately after an engine stall or surge recovery, without high fuel flow (without high turbine power output and high turbine inlet pressure) and the associated risk of another engine stall or surge.

The electric motor 66 may provide acceleration of any suitable speed, but in some embodiments a rotational speed of the high pressure compressor 52 is within about +1-30% of a rotational speed of the high speed turbine 54. In some embodiments, when no electrical power is applied, the gearbox outputs a ratio of 1:1, meaning that without the application of electrical power the rotational speed of the high pressure compressor 52 equals the rotational speed of the high speed turbine 54. In other embodiments, this default gear ratio may be other than 1:1. While in some embodiments, the electric motor 66 is utilized to accelerate the high pressure compressor 52, the electric motor 66 may also be an electric machine that can be utilized as a generator to brake or decelerate the high pressure compressor, for example to reduce aerodynamic loading on the compressor blades and aid in stall prevention or initial stall recovery. In some embodiments, the electric motor 66 is a variable speed motor such that additional variability of the relative speed of the high pressure compressor 52 and the high speed turbine 54 may be achieved by varying the speed of the electric motor 66. In some embodiments, it is desired to actively control a relative speed of the compressor shaft 62 and the turbine shaft 60. As such, a compressor speed sensor 82 may be used to detect a compressor shaft speed, and a turbine speed sensor 84 may be used to detect a turbine shaft speed. The speed sensors 82, 84 are connected to a controller 86, which is also connected to the electric motor 66. The detected compressor shaft speed and turbine shaft speed are compared to a desired compressor shaft speed and turbine speed or compared to a desired speed ratio or the like. If one or more of the measured speeds fall outside of a desired range, the controller 86 directs operation of the electric motor 66 to apply input to the gearbox 64 or stop or change the input of the electric motor 66 to the gearbox 64. Further, the electric motor 66 may include a brake mechanism to prevent unnecessary rotation of the electric motor 66 when its input is not desired or needed at the gearbox 64. Such a brake mechanism may be operated by the controller 86 and prevents overheat of the electric motor 66.

Although the embodiment provided above describes a differential gearbox 64 and electric motor 66 drive on the high speed spool 32 of a gas-turbine engine, the same type of gearbox 64 and electric motor 66 arrangement could advantageously be applied to the low speed spool 30 of a gas-turbine engine, instead of or in addition to the gearbox 64 and electric motor 66 arrangement on the high speed spool 32.

Figure 6:
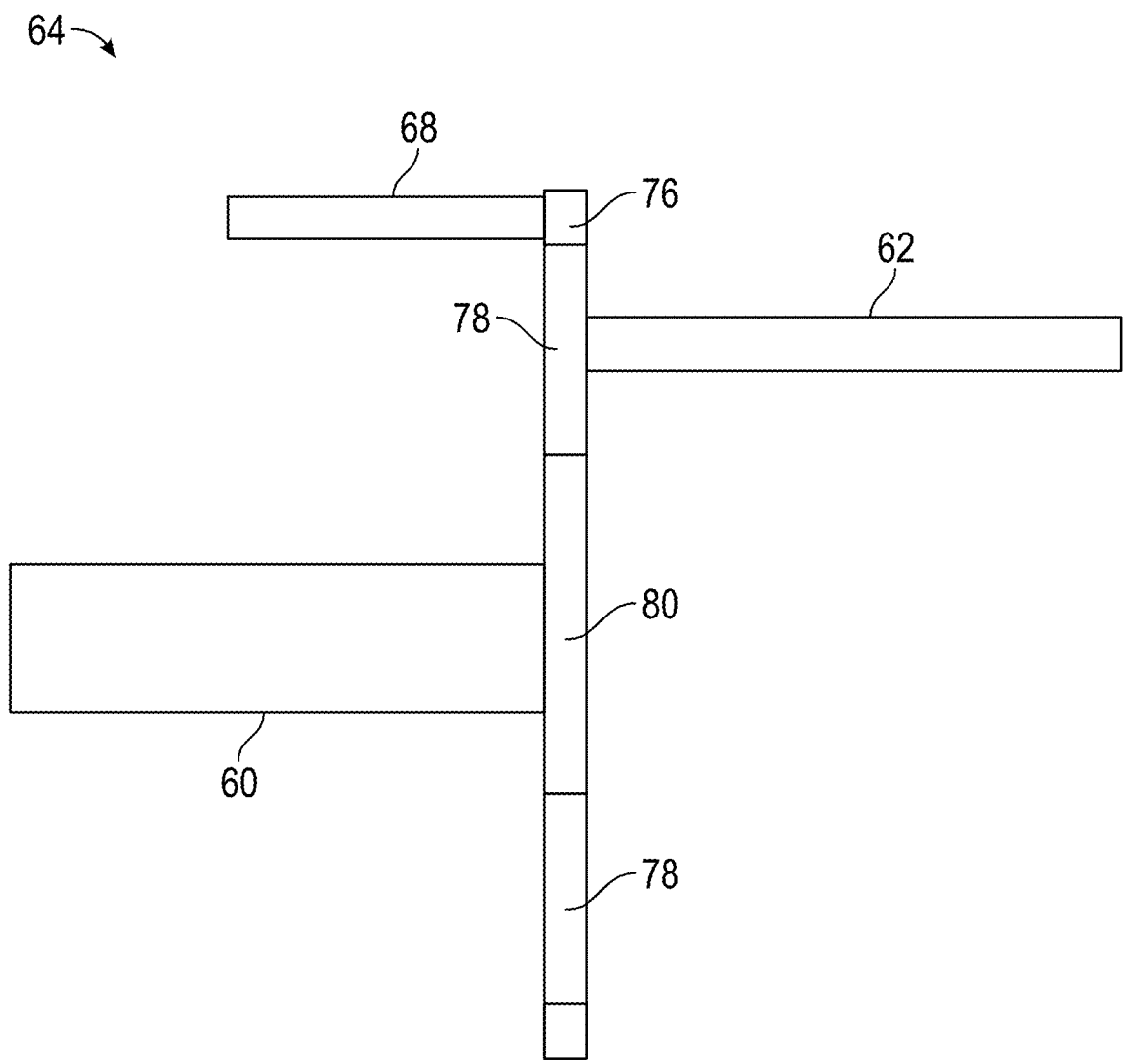
FIG. 6 is a schematic illustration of a planetary gearbox arrangement.

In some embodiments, such as shown in FIG. 6, the gearbox 64 has a planetary gear arrangement. The teeth of the gears are omitted in FIG. 6 for clarity. In such a planetary gear arrangement, the tower shaft 68 would input to a ring gear 76, and the compressor shaft 62 is connected to one or more planet gears 78, while the turbine shaft 60 is connected to a sun gear 80. Thus, when power is input to the ring gear 76 from the electric motor 66, the compressor shaft 62 accelerates while the turbine shaft 60 speed would stay the same. One skilled in the art, however, will readily appreciate that such an arrangement is merely exemplary, and that many other arrangements are possible. Any arrangement of meshed gears that defines the relative rotation (speeds) of three different shafts which penetrate the gearbox 64 could be used. Of the three shafts which penetrate the gearbox 62, one would connect to the compressor, one to the turbine, and one to the electric motor 66.

Figure 3:
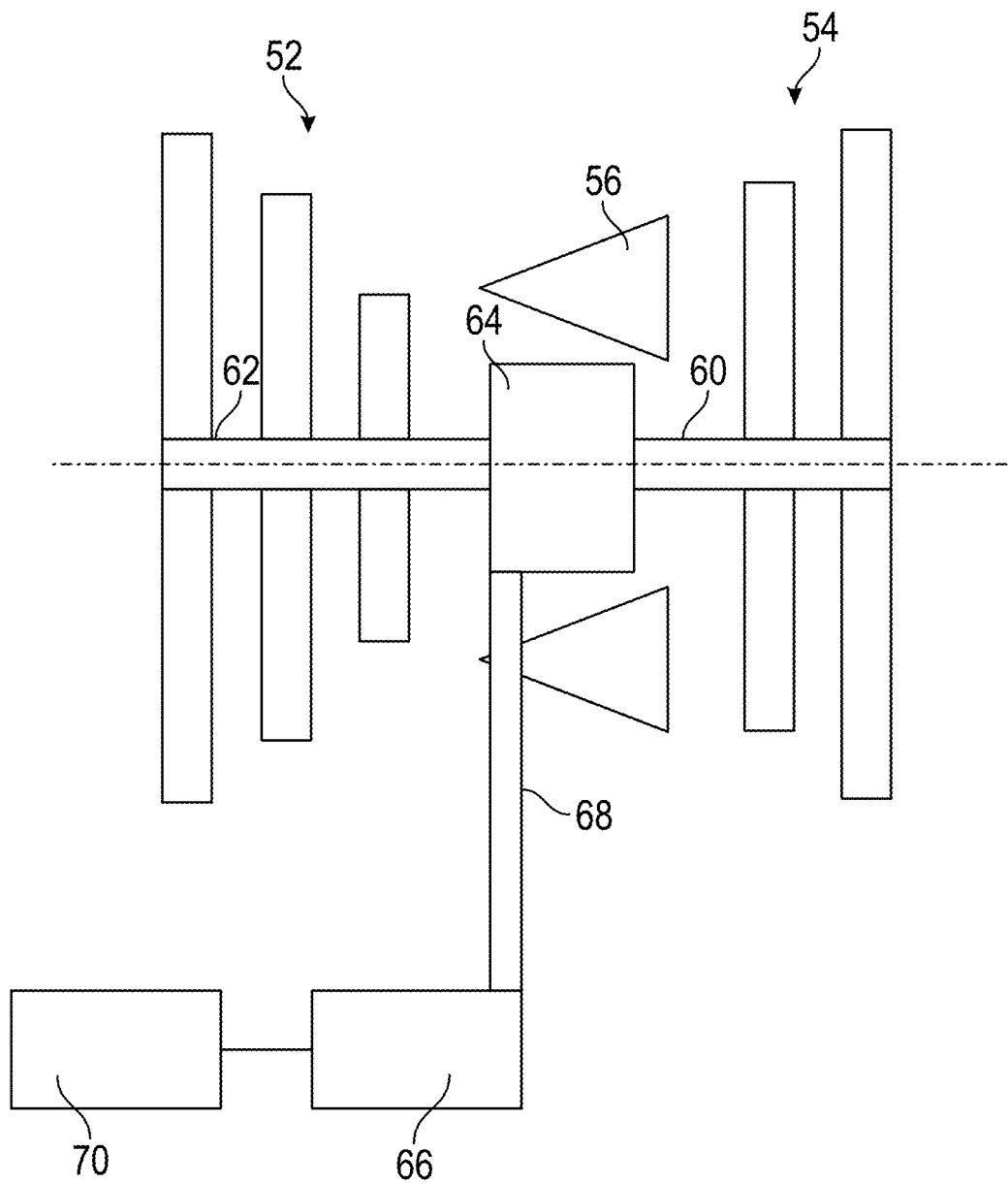
FIG. 3 is a schematic illustration of another embodiment of a variable differential gearbox arrangement of a hybrid electric turbine engine.
Figure 4:
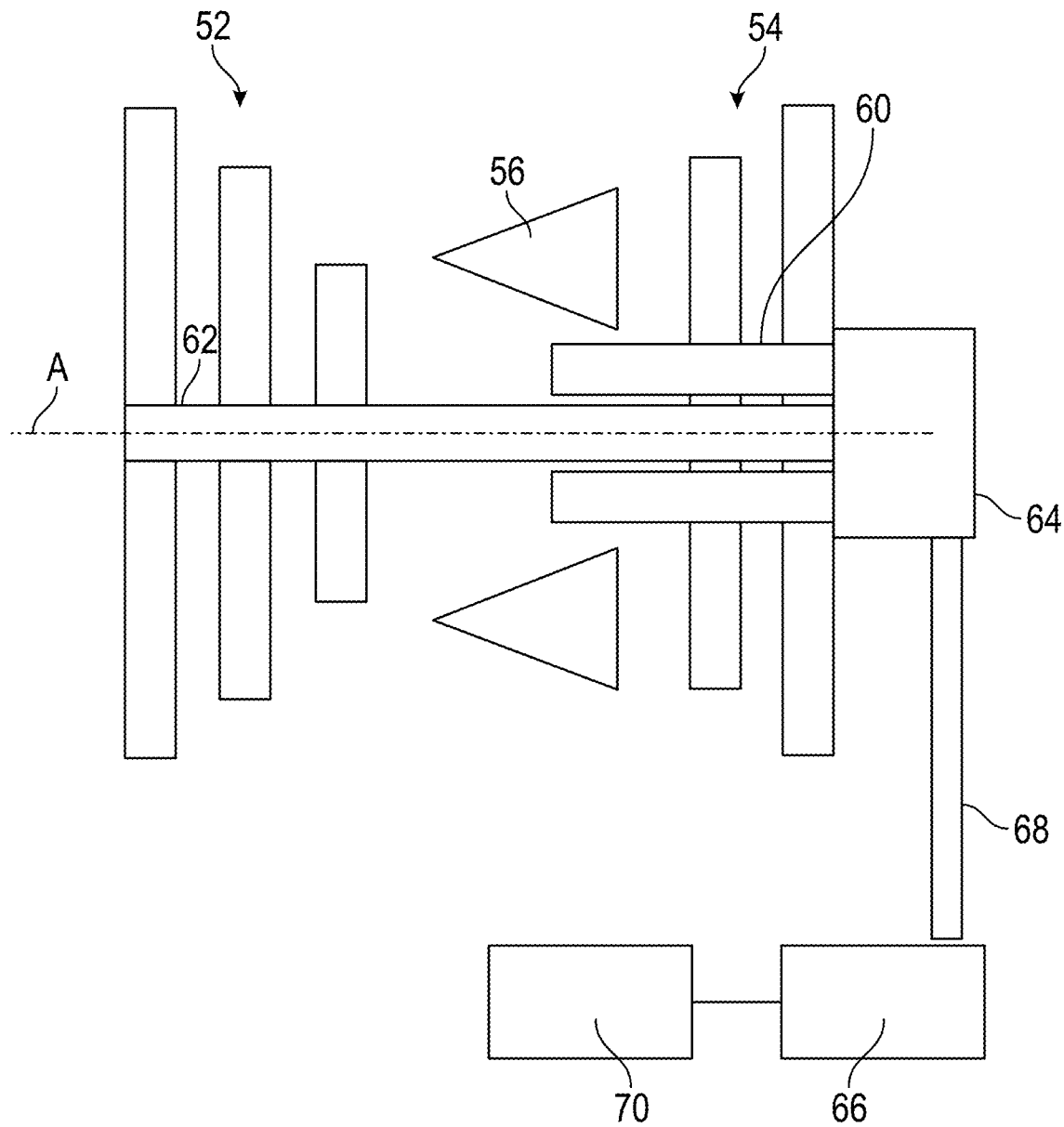
FIG. 4 is a schematic illustration of yet another embodiment of a variable differential gearbox arrangement of a hybrid electric turbine engine.
Figure 5:
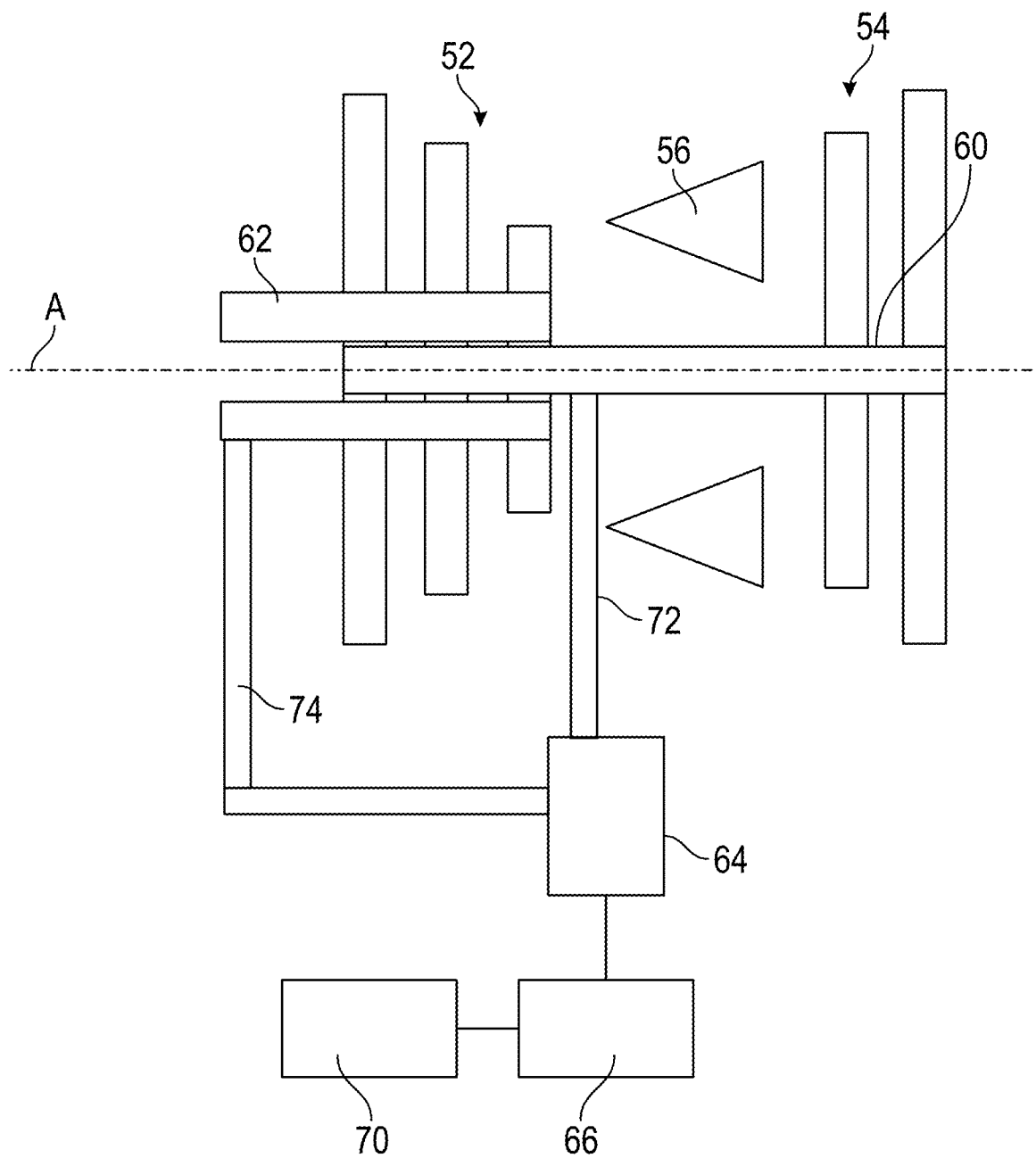
FIG. 5 is a schematic illustration of still another embodiment of a variable differential gearbox arrangement of a hybrid electric turbine engine.

In some embodiments, such as shown in FIG. 2, the turbine shaft 60 and the compressor shaft 62 are coaxial along the engine central longitudinal axis A, with the turbine shaft 60 extending inside of the compressor shaft 62 to connect with the gearbox 64, and the gearbox 64 is located upstream of the high pressure compressor 52. The arrangement, however, may vary based on packaging requirements or the like. For example, another configuration is shown in FIG. 3 where the compressor shaft 62 and the turbine shaft 60 are coaxial, with the gearbox 64 located axially between the compressor shaft 62 and the turbine shaft 60. In this embodiment, the turbine shaft 60 extends from the gearbox 64 in a first axial direction, and the compressor shaft 62 extends from the gearbox 64 is a second, opposite, direction. In other embodiments, such as shown in FIG. 4, the gearbox 64 is located axially aft of the high pressure turbine 54, with the compressor shaft 62 in this embodiment located radially inboard of the turbine shaft 60 to extend at least partially inside of the turbine shaft 60 and connect to the gearbox 64. Referring now to FIG. 5, in other embodiments, the gearbox 64 is located remotely from the engine central longitudinal axis A. For example, in some embodiments a first drive shaft 72 extends to and is operably connected to the turbine shaft 60, and a second drive shaft 74 extends to and is operably connected to the compressor shaft 62. The remote location of the gearbox 64 further improves flexibility in the packaging of the engine 10.

While the present disclosure is described in the context of a two-spool engine 10, one skilled in the art will readily appreciate that the configurations disclosed herein may be readily applied to a single spool or other multiple spool engines, such as a three spool engine. The variable gear ratio allows for acceleration of, for example the high pressure compressor 52 relative to the high pressure turbine 54, which improves stall recovery performance. Further, such differential speed operation of the high pressure compressor 52 relative to the high pressure turbine 54 has benefits to the engine 10 in the areas of operability, performance, fuel economy and noise reduction.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A hybrid electric engine of an aircraft, comprising:
a high pressure compressor located at and rotatable about an engine central longitudinal axis;
a high pressure turbine located at and rotatable about the engine central longitudinal axis, the high pressure turbine operably connected to the high pressure compressor via a variable gear ratio gearbox;
a combustor configured to drive the high pressure turbine via a flow of combustion products; and
an electric motor operably connected to the variable gear ratio gearbox and configured to input rotational energy into the variable gear ratio gearbox;
wherein the rotational energy inputted into the variable gear ratio gearbox from the electric motor changes a rotational speed of one of the high pressure compressor or the high pressure turbine relative to the other of the high pressure compressor or the high pressure turbine;
wherein the variable gear ratio gearbox is located axially between the high pressure compressor and the high pressure turbine;
wherein:
the variable gear ratio gearbox is operably connected to the high pressure turbine via a first tower shaft operably connected to a turbine shaft at a first axial end of the high pressure compressor; and
the variable gear ratio gearbox is operably connected to the high pressure compressor via a second tower shaft operably connected to a compressor shaft at a second axial end of the high pressure compressor opposite the first axial end;
wherein the compressor shaft is located radially outboard of the turbine shaft and axially overlaps the turbine shaft.

2. The hybrid electric engine of claim 1, wherein the rotational energy accelerates the high pressure compressor relative to the high pressure turbine.

3. The hybrid electric engine of claim 1, wherein the rotational energy decelerates the high pressure compressor relative to the high pressure turbine.

4. The hybrid electric engine of claim 1, wherein in the variable gear ratio gearbox includes a planetary gear arrangement.

5. The hybrid electric engine of claim 1, wherein the electric motor is a variable speed electric motor.

6. The hybrid electric engine of claim 1, further comprising:
a compressor speed sensor configured to detect a compressor shaft speed; and
a turbine speed sensor configured to detect a turbine shaft speed;
wherein operation of the electric motor is selectably changed as a result of the detected compressor shaft speed and the detected turbine shaft speed.

7. The hybrid electric engine of claim 1, wherein the electric motor includes a brake mechanism to stop rotation of the electric motor.

8. A method of operating a hybrid electric engine, comprising:
combusting a fuel at a combustor;
driving a high pressure turbine about an engine central longitudinal axis via products of combusting the fuel at the combustor;
driving a high pressure compressor about the engine central longitudinal axis via driving of the high pressure turbine, the high pressure turbine and the high pressure compressor operably connected to a variable gear ratio gearbox;
inputting rotational energy from an electric motor into the variable gear ratio gearbox;

changing a rotational speed of the high pressure compressor relative to the high pressure turbine via inputting the rotational energy into the variable gear ratio gearbox;

wherein the variable gear ratio gearbox is located remotely from the engine central longitudinal axis;

wherein the variable gear ratio gearbox is located axially between the high pressure compressor and the high pressure turbine;

wherein:
   the variable gear ratio gearbox is operably connected to the high pressure turbine via a first tower shaft operably connected to a turbine shaft at a first axial end of the high pressure compressor; and
   the variable gear ratio gearbox is operably connected to the high pressure compressor via a second tower shaft operably connected to a compressor shaft at a second axial end of the high pressure compressor opposite the first axial end;

wherein the compressor shaft is located radially outboard of the turbine shaft and axially overlaps the turbine shaft.

9. The method of claim 8, further comprising accelerating the high pressure compressor relative to the high pressure turbine by inputting the rotational energy.

10. The method of claim 9, wherein the rotational speed of the high pressure compressor is increased by up to about 30% relative to a rotational speed of the high pressure turbine.

11. The method of claim 8, further comprising decelerating the high pressure compressor relative to the high pressure turbine by inputting the rotational energy.

12. The method of claim 8, wherein a default speed ratio of the high pressure compressor to the high pressure turbine without inputting the rotational energy from the electric motor is other than 1:1.

13. The method of claim 8, further comprising varying a speed of the electric motor.

14. The method of claim 8, further comprising:

detecting a compressor shaft speed via a compressor speed sensor;

detecting a turbine shaft speed via a turbine speed sensor; and selectably changing operation of the electric motor as a result of the detected compressor shaft speed and the detected turbine shaft speed.

* * * * *